(12) United States Patent
Park (10) Patent No.: US 8,173,930 B2
(45) Date of Patent: May 8, 2012

(54) APPARATUS FOR CUTTING SUBSTRATE

(75) Inventor: Jeong Kweon Park, Gumi-shi (KR)

(73) Assignee: LG Display Co., Ltd., Seoul (KR)

( * ) Notice: Subject to any disclaimer, the term of this patent is extended or adjusted under 35 U.S.C. 154(b) by 183 days.

(21) Appl. No.: 12/591,500

(22) Filed: Nov. 20, 2009

(65) Prior Publication Data

US 2010/0072183 A1  Mar. 25, 2010

Related U.S. Application Data

(62) Division of application No. 11/246,148, filed on Oct. 11, 2005, now Pat. No. 7,638,729.

(30) Foreign Application Priority Data

Nov. 5, 2004  (KR) .................. 10-2004-0089703

(51) Int. Cl.
*B23K 26/16* (2006.01)
*B23K 26/06* (2006.01)

(52) U.S. Cl. .................. 219/121.67; 219/121.73

(58) Field of Classification Search ... 219/121.6–121.86
See application file for complete search history.

(56) References Cited

U.S. PATENT DOCUMENTS

| | | | |
|---|---|---|---|
| 5,091,627 A | 2/1992 | Kimura | 219/121.83 |
| 6,437,283 B1 * | 8/2002 | Wiggermann et al. | 219/121.7 |
| 6,951,627 B2 | 10/2005 | Li et al. | 264/400 |
| 7,671,295 B2 * | 3/2010 | Sun et al. | 219/121.6 |
| 2001/0019044 A1 | 9/2001 | Bertez et al. | |
| 2004/0002199 A1 | 1/2004 | Fukuyo et al. | |
| 2005/0006361 A1 | 1/2005 | Kobayashi et al. | 219/121.73 |
| 2005/0274702 A1 | 12/2005 | Deshi | 219/121.72 |
| 2006/0076326 A1 | 4/2006 | Kobayashi et al. | 219/121.73 |

FOREIGN PATENT DOCUMENTS

| | | |
|---|---|---|
| DE | 196 19 339 | 11/1996 |
| DE | 196 16 327 | 11/1997 |
| JP | 1-186293 | 7/1989 |
| JP | 07-080672 A | 3/1995 |
| JP | 2001-236002 | 8/2001 |
| JP | 2002-205180 | 7/2002 |
| JP | 2002-307176 | 10/2002 |
| JP | 2003-154517 | 5/2003 |
| JP | 2003-517931 | 6/2003 |
| KR | 10-2002-0032291 | 5/2002 |
| WO | WO 2004/105995 | 12/2004 |

* cited by examiner

*Primary Examiner* — Sang Paik
(74) *Attorney, Agent, or Firm* — McKenna Long & Aldridge, LLP (57) ABSTRACT

An apparatus for cutting a substrate includes a laser oscillator generating a femtosecond laser beam, a first beam splitter splitting the femtosecond laser beam into first and second femtosecond laser beams, a first condenser lens receiving the first femtosecond laser beam and condensing the first femtosecond laser beam to have a first focal depth, a second condenser lens receiving the second femtosecond laser beam, and condensing the second femtosecond laser beam to have a second focal depth different from the first focal depth, and a second beam splitter receiving and splitting the first femtosecond laser beam condensed through the first condenser lens and the second femtosecond laser beam condensed through the second condenser lens, and irradiating the split first and second femtosecond laser beams at different positions on a substrate to be cut.

1 Claim, 7 Drawing Sheets

APPARATUS FOR CUTTING SUBSTRATE

CROSS-REFERENCE TO RELATED APPLICATIONS

This application is a Divisional of application Ser. No. 11/246,148 filed Oct. 11, 2005 now U.S. Pat. No. 7,638,729, now allowed; which claims priority to Korean Patent Application No. 10-2004-0089703 filed Nov. 5, 2004, all of which are hereby incorporated by reference for all purposes as if fully set forth herein.

BACKGROUND OF THE INVENTION

1. Field of the Invention

The present invention relates to a liquid crystal display (LCD) device, and more particularly, to an apparatus for cutting a substrate and a method using the same. Although the present invention is suitable for a wide scope of application, it is particularly suitable for improving yield in manufacturing liquid crystal display devices.

2. Discussion of the Related Art

With the recent rapid development of information communication fields, the industries associated with displays adapted to display desired information are gaining importance. Of such information displays, cathode ray tubes (CRTs) have continuously drawn attention by virtue of advantages such as reproducibility of diverse colors and superior screen brightness. Due to the recent demand for large-size, portable and high-resolution displays, however, the development of flat panel displays is in high demand, in order to replace CRTs which are heavy and bulky.

Flat panel displays are applicable to wide and diverse fields such as computer monitors and monitors for both aircraft and spacecraft. As currently-developed or commercially-available flat panel displays, there are LCDs, electro-luminescent displays (ELDs), field emission displays (FEDs), plasma display panels (PDPs), and the like.

A process of manufacturing such flat panel displays usually involves separating a fragile mother substrate into a plurality of unit LCDs using a cutting process. On the mother substrate, a plurality of unit elements, such as semiconductor chips are formed in a matrix form to create large-scale integrated circuits.

There are basically two cutting process used for separating the fragile mother substrate, which may be made of glass, silicon, or ceramic. The first process is a dicing method in which cutting grooves are formed on the substrate using a diamond blade having a thickness of 50 to 200 μm while the diamond is rotated at high speed. The second process is a scribing method in which cutting grooves are formed on a surface of the substrate by a scribing wheel made of a diamond having a thickness of 0.6 to 2 mm, so as to form a crack in a thickness direction of the substrate.

The dicing method is suitable for cutting of a substrate formed with a thin film or a convex portion at a surface of the substrate because a very thin blade is used, as compared to the scribing method. In the dicing method, however, frictional heat is generated at a region where the blade performs a cutting process. Furthermore, since the cutting process is carried out under the condition in which cooling water is supplied to the cutting region, the dicing method is not considered to be a method suitable for a flat panel display which includes metal portions, such as Metal electrode layers or metal terminals.

In other words, in the dicing method, it is difficult to completely remove the cooling water after the cutting process. When moisture remains due to the incomplete removal of the cooling water, there may be a possibility that the metal portions of the flat panel display may be eroded. Furthermore, the dicing method has a problem of a prolonged cutting time, thereby lowering yield, as compared to the scribing method.

On the other hand, it is unnecessary to use cooling water in the scribing method. Accordingly, the scribing method exhibits superior throughput, as compared to the dicing method. Also, since the cutting time required in the scribing method is shorter than that of the dicing method, the scribing method has an advantage in better yield.

Figure 1:
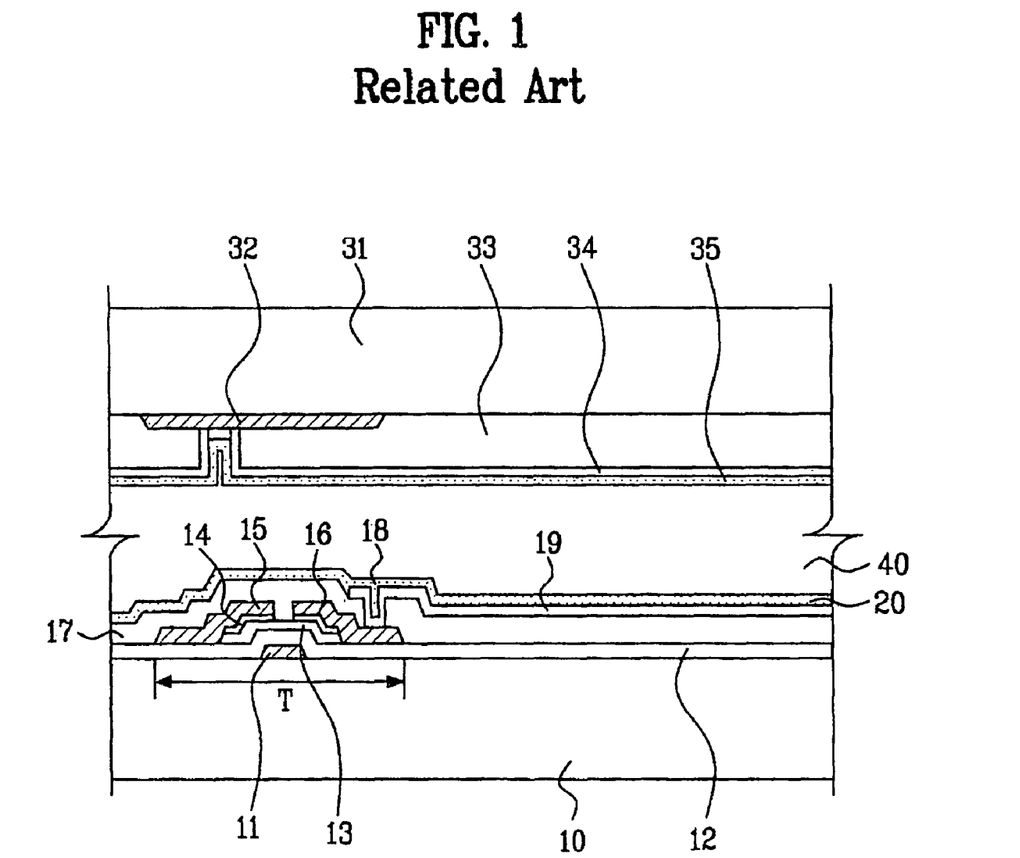
FIG. 1 is a cross-sectional view illustrating the related art LCD.

FIG. 1 is a cross-sectional view illustrating the related art LCD device. This LCD device is manufactured in accordance with the following method. For simplicity, descriptions will be made only in conjunction with one pixel region.

As shown in FIG. 1, a gate electrode 11 of a conductive material, such as metal, is deposited on a first transparent substrate 10 at a predetermined region. A gate insulating film 12 of a silicon nitride (SiNx) or silicon oxide (SiO$_2$) is then deposited over the entire upper surface of the first substrate 10 including the gate electrode 11.

Thereafter, an active layer 13 of amorphous silicon is formed on the gate insulating film 12 at a region corresponding to the gate electrode 11. An ohmic contact layer 14 is formed on the active layer 13 at regions corresponding to respective lateral edge portions of the active layer 13. The ohmic contact layer 14 is formed of doped amorphous silicon.

Source and drain electrodes 15 and 16, which are formed of a conductive material such as metal, are subsequently formed on the ohmic contact layer 14. The source and drain electrodes 15 and 16 constitute a thin film transistor T, together with the gate electrode 11. Meanwhile, although not shown in the drawing, the gate electrode 11 is connected to a gate line, and the source electrode 15 is connected to a data line. The gate line and the data line cross each other, and define a pixel region.

A protective film 17 is then formed over the entire upper surface of the first substrate 10 including the source and drain electrodes 15 and 16. The protective film 17 is formed of a silicon nitride, silicon oxide, or organic insulating material. The protective 17 has a contact hole 18 through which a predetermined portion of the surface of the drain electrode 16 is exposed. Thereafter, a pixel electrode 19 of a transparent conductive material is formed on the protective film 17 at the pixel region. The pixel electrode 19 is connected to the drain electrode 16 via the contact hole 18.

A first orientation film 20 is then formed over the entire upper surface of the first substrate 10 including the pixel electrode 19. The first orientation film 20 is polyimide, and has a surface on which the molecules of the first orientation film 20 are oriented in a predetermined direction. Meanwhile, a second transparent substrate 31 is arranged over the first substrate 10 while being vertically spaced apart from the first substrate 10 by a predetermined distance.

A black matrix 32 is formed on a lower surface of the second substrate 31 at a region corresponding to the thin film transistor T of the first substrate 10. Although not shown in the drawing, the black matrix 32 also covers a region except for the pixel electrode 19.

A color filter 33 is then formed on the second substrate 31 beneath the black matrix 32. Practically, color filters are arranged in the form of repeated filter patterns of red (R), green (G), and blue (B), each of which corresponds to one pixel region.

A common electrode 34 of a transparent conductive material is subsequently formed on the second substrate 31 beneath the color filter 33. A second orientation film 35 is then formed on the second substrate 31 beneath the common electrode 34. The second orientation film 35 is of polyimide, and has a surface on which the molecules of the second orientation film 35 are oriented in a predetermined direction. Then, a liquid crystal layer 40 is formed between the first orientation film 20 and the second orientation film 35.

The above-described LCD device is manufactured using an array substrate fabrication process involving formation of thin film transistors and pixel electrodes on a substrate to fabricate an array substrate, a color filter substrate fabrication process involving formation of color filters and a common electrode on another substrate to fabricate a color filter substrate, and a liquid crystal panel fabrication process involving arrangement of the fabricated substrates, injection and sealing of a liquid crystal material, and attaching polarizing plates, to thereby complete in fabricating a liquid crystal panel.

Figure 2:
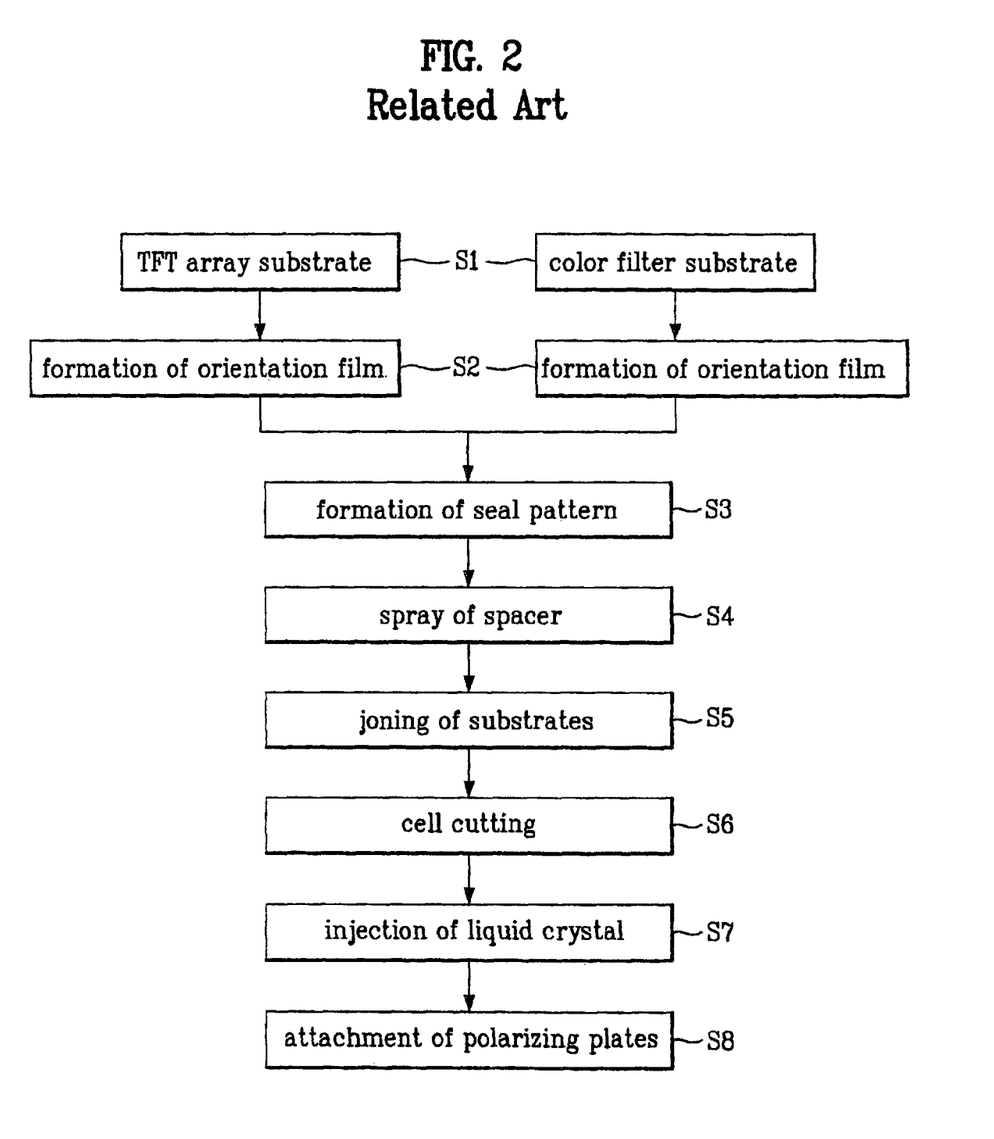
FIG. 2 is a flow chart illustrating the related art LCD manufacturing method.

FIG. 2 is a flow chart illustrating the related art LCD manufacturing method.

In accordance with this method, a thin film transistor (TFT) array substrate including TFTs, and a color filter substrate including color filters are first prepared (S1), as shown in FIG. 2. The TFT array substrate is fabricated by repeatedly performing processes of depositing a thin film and pattering the deposited thin films. In this case, the number of masks used for patterning of thin films in the fabrication of the TFT array substrate represents the number of processes used in the fabrication of the TFT array substrate. Currently, research is being actively made to reduce the number of masks, thereby reducing the manufacturing cost.

The color filter substrate is fabricated by sequentially forming a black matrix for preventing light leakage through a region except for pixel regions, such as R, G, and B color filters and a common electrode. The color filters may be formed using one of a dyeing method, a printing method, a pigment dispersion method, an electro-deposition method, or the like. Currently, the pigment dispersion method is mostly used.

Thereafter, an orientation film is formed over each substrate to determine an initial alignment direction of liquid crystal molecules (S2). The formation of the orientation film is achieved using a process for coating a polymer thin film, and treating the surface of the polymer thin film such that the molecules of the polymer thin film on the treated surface are oriented in a predetermined direction. Generally, polyimide-based organic materials are mainly used for the orientation film. For the orientation method, a rubbing method is mostly used.

In accordance with the rubbing method, the orientation film is rubbed in a predetermined direction, using a rubbing cloth. This rubbing method is suitable for mass production because treatment for orientation can be easily achieved. Also, the rubbing method has advantages of stable orientation and easy control of a pre-tilt angle. Recently, an optical orientation method has been developed and practically used that achieves orientation using polarized beams.

Next, a seal pattern is formed at one of the two substrates (S3). The seal pattern is arranged around a region where an image is displayed. The seal pattern has a port for injecting a liquid crystal material, and serves to prevent the injected liquid crystal material from leaking.

The seal pattern is formed by forming a thermosetting resin layer to have a predetermined pattern. For the formation of the seal pattern, a screen printing method using a screen mask, and a seal dispenser method using a dispenser may be used.

Currently, the screen printing method is mainly used because it has a more convenient process. However, the screen printing method also has a drawback in that products with poor quality may be produced because the screen mask may come into contact with the orientation film. Furthermore, the screen mask cannot easily cope with a large-sized substrate size. For this reason, substitution of the seal dispenser method for the screen printing method is being gradually increased.

Subsequently, spacers having a predetermined size are sprayed on one of the TFT array substrate and the color filter substrate to maintain an accurate and uniform space between the two substrates (S4). For a method of spraying spacers, there are a wet spray method in which spacers are sprayed in a state of being mixed with alcohol, and a dry spray method in which just spacers are sprayed alone. For the dry spray method, there is an electrostatic spray method using static electricity and an ionic spray method using pressurized gas. Since LCDs are vulnerable to static electricity, the ionic spray method is mainly used.

Thereafter, the two substrates of the LCD (i.e., the TFT array substrate and the color filter substrate) are arranged such that the seal pattern is interposed between the substrates. In this state, the seal pattern is cured under pressure to attach the substrates (S5). In this case, the orientation films of the substrates face each other, and the pixel electrodes and the color filters correspond to each other one by one.

Next, the joined substrates are cut to be separated into a plurality of unit liquid crystal panels (S6). Generally, a plurality of liquid crystal panels, each of which will be one LCD device, are formed on one substrate sheet, and are then separated into individual ones, to achieve an enhancement in manufacturing efficiency and a reduction in manufacturing costs.

The liquid crystal panel cutting process includes a scribing process for forming a crack in the surface of each substrate using a scribing wheel made of a diamond material having hardness higher than that of the substrate, which is made of, for example, glass. The liquid crystal panel cutting process further includes a breaking process for positioning a breaking bar at a portion of the substrate where the crack is formed. Subsequently, a predetermined pressure is applied to the breaking bar, thereby cutting the substrate in a direction along which the crack extends.

Next, a liquid crystal material is injected between the two substrates of each liquid crystal panel (S7). For the injection of the liquid crystal, a vacuum injection method is mainly used which utilizes a pressure difference between the interior and exterior of the liquid crystal panel. Micro air bubbles may be present amongst the liquid crystal molecules injected into the interior of the liquid crystal panel, so that bubbles may be present in the interior of the liquid crystal panel, thereby causing the liquid crystal panel to have poor quality. In order to prevent such a problem, accordingly, it is necessary to perform a de-bubbling process in which the liquid crystal is maintained in a vacuum state for a prolonged time to remove bubbles.

After completion of the liquid crystal injection, the injection port is sealed to prevent the liquid crystal from leaking out of the injection port. The sealing of the injection port is achieved by coating an ultraviolet-setting resin over the injection port, and irradiating ultraviolet rays to the coated resin, thereby setting the coated resin.

Next, polarizing plates are attached to the outer surfaces of the liquid crystal panel fabricated in the above-mentioned manner, and driving circuits are then connected to the liquid crystal panel. Thus, the fabrication of an LCD device is complete (S8). Hereinafter, a related art substrate cutting apparatus and a related art substrate cutting method using the same will be described with reference to the annexed drawings.

Figure 3:
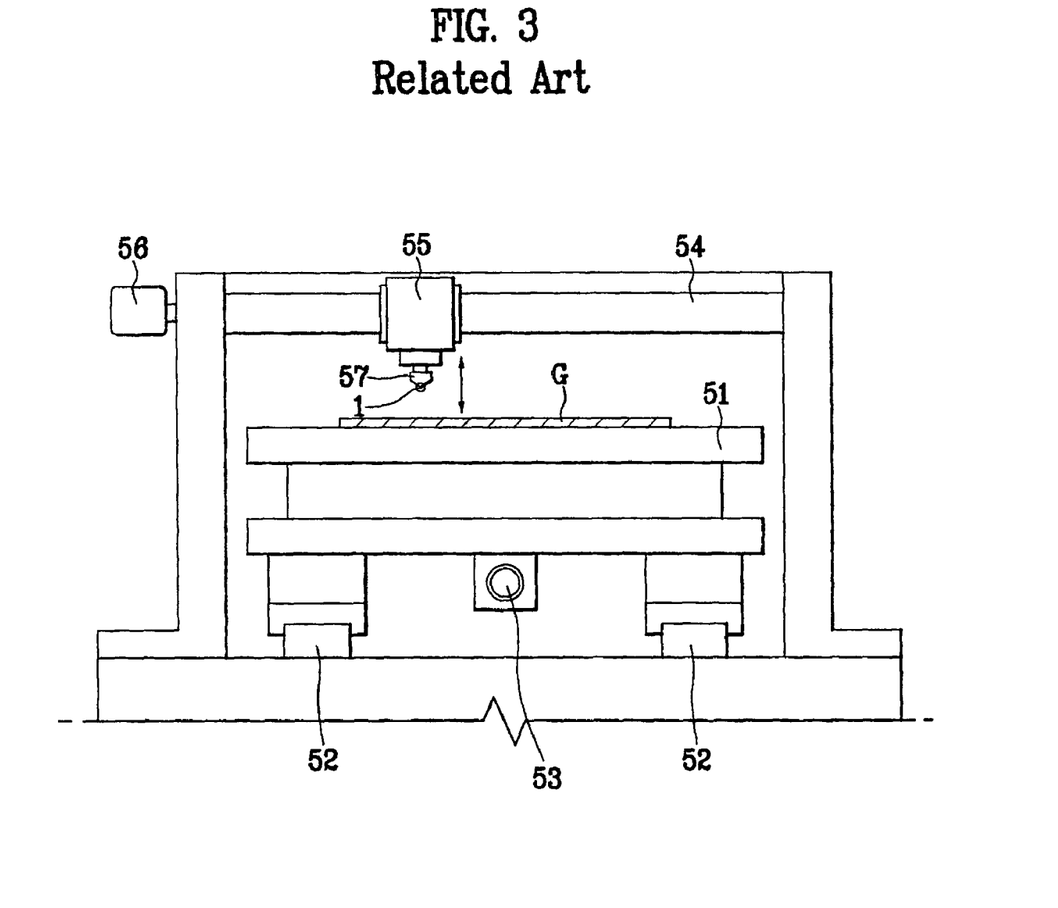
FIG. 3 is a schematic view illustrating the related art scribing device.

FIG. 3 is a schematic view illustrating a related art scribing device. As shown in FIG. 3, the related art scribing device includes a table 51, on which a substrate G is positioned, a vacuum chucking unit (not shown) adapted to fix the substrate G to the table 51, and a pair of parallel guide rails 52 for pivotally supporting the table 51 in a suspended state while allowing the table 51 to be movable in a Y-axis direction. The scribing device also includes a ball screw 53 for moving the table 51 along the guide rails 52, a guide bar 54 installed above the table 51 such that the guide bar 54 extends in an X-axis direction, and a scribing head 55 mounted on the guide bar 54 such that the scribing head 55 can slide in the X-axis direction along the guide bar 54. The scribing device further includes a motor 56 for sliding the scribing head 55, a tip holder 57 mounted to a lower end of the scribing head 55 such that the tip holder 57 is vertically movable while being rotatable, and a scribing wheel 1 rotatably mounted to a lower end of the tip holder 57.

In the related art substrate cutting method using the above-mentioned scribing device, a crack having a certain depth is formed in a substrate to be cut, in accordance with rotation of the scribing wheel 1. The crack-formed substrate is then fed to a breaking device, in which a pressure is applied to the substrate along the crack by a breaking bar, thereby cutting the substrate.

Figure 4:
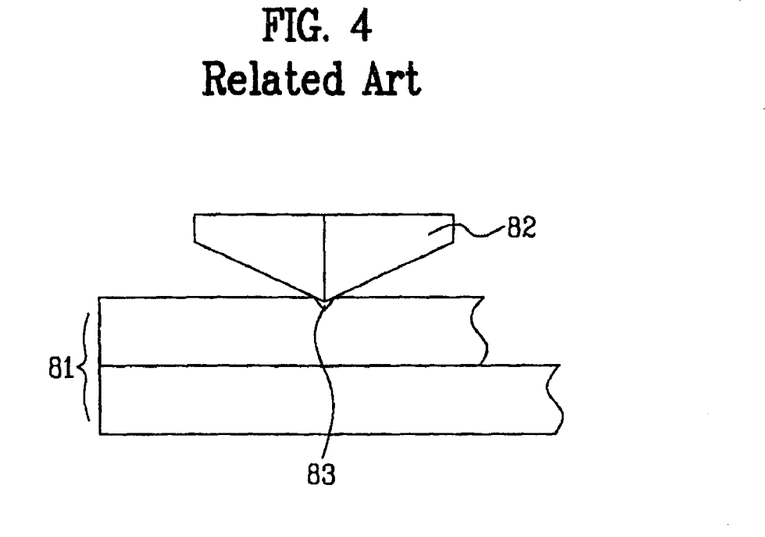
FIGS. 4 and 5 are schematic views respectively illustrating scribing and breaking processes involved in the related art substrate cutting method.
Figure 5:
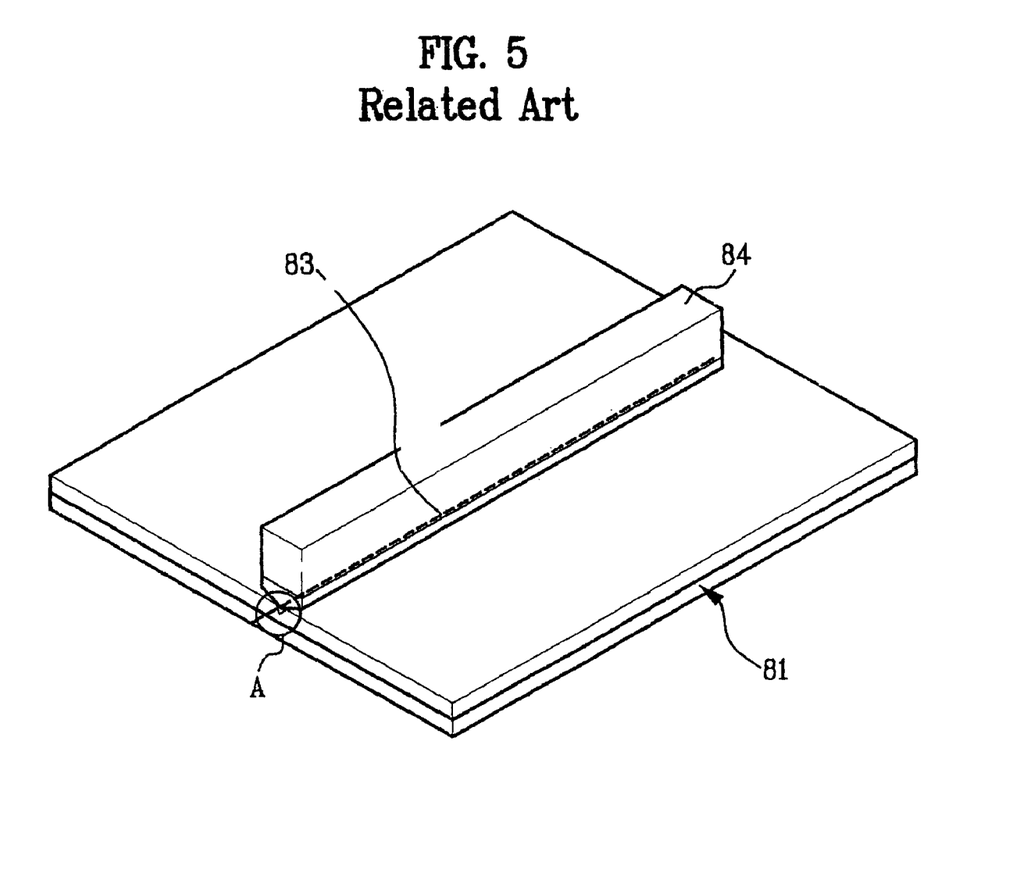

FIGS. 4 and 5 are schematic views respectively illustrating scribing and breaking processes involved in the related art substrate cutting method. In the scribing process, the scribing wheel or cutting wheel 82 brings into contact with the surface of a substrate 81, as shown in FIG. 4. In such a state, the scribing wheel 82 is rotated along the substrate 81 while applying pressure of about 2.40 Kgf/cm² to the substrate 81. As a result, a crack 83 with a certain depth is formed in the surface of the substrate 81 along a track of the scribing wheel 82.

Thereafter, the breaking process is carried out along the crack 83 in the surface of the substrate 81 to cut the substrate 81. That is, as shown in FIG. 5, a breaking bar 84 is arranged on the substrate 81 in which the crack 83 has been formed in the scribing process. The portion of the breaking bar 84 coming into direct contact with the surface of the substrate 81, that is, a portion A of the breaking bar 84, is made of a material which is sufficiently hard, but does not form scratches on the surface of substrate 81, such as urethane rubber.

Next, pressure is momentarily applied to the substrate 81 by the breaking bar 84 under the condition in which the breaking bar 84 is accurately aligned with the crack 83. As a result, the crack 83 is extended, thereby causing the substrate 81 to be cut.

Thereafter, a grinding process is carried out using a grindstone having a predetermined mesh size, in order to grind cut surfaces and corners of the substrate formed after the scribing and breaking processes.

Thus, in accordance with the related art substrate cutting method, a plurality of liquid crystal panels formed on the substrate are separated into a plurality of unit LCD devices in accordance with the above-mentioned scribing and breaking processes. However, the above-mentioned related art substrate cutting method has various problems. For example, the scribing wheel used in the scribing process for cutting the substrate is expensive and has a short lifespan, necessitating periodic replacement thereof. For this reason, an increase in manufacturing cost is incurred.

SUMMARY OF THE INVENTION

Accordingly, the present invention is directed to an apparatus for cutting a substrate and a method using the same that substantially obviate one or more problems due to limitations and disadvantages of the related art.

An object of the present invention is to provide an apparatus for cutting a substrate which uses condenser lenses having different depths of focus in a process of cutting a substrate using a femtosecond laser, thereby reducing a taper angle of the cut surface.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for cutting a substrate includes a laser oscillator generating a femtosecond laser beam, a first beam splitter splitting the femtosecond laser beam into first and second femtosecond laser beams, a first condenser lens receiving the first femtosecond laser beam and condensing the first femtosecond laser beam to have a first focal depth, a second condenser lens receiving the second femtosecond laser beam, and condensing the second femtosecond laser beam to have a second focal depth different from the first focal depth, and a second beam splitter receiving and splitting the first femtosecond laser beam condensed through the first condenser lens and the second femtosecond laser beam condensed through the second condenser lens, and irradiating the split first and second femtosecond laser beams at different positions on a substrate to be cut.

In another aspect of the present invention, an apparatus for cutting a substrate includes a plurality of laser oscillators generating at least first and second femtosecond laser beams, a plurality of condenser lenses receiving the at least first and second femtosecond laser beams, and condensing the received at least first and second femtosecond laser beams to have first and second focal depths being different from each other, respectively, a reflector reflecting the first condensed femtosecond laser beam, and a beam splitter receiving and splitting the condensed at least first and second femtosecond laser beams, and irradiating the split at least first and second femtosecond laser beams at different positions on a substrate to be cut.

In a further aspect of the present invention, a method for cutting a substrate includes arranging the substrate on a stage and generating a femtosecond laser beam from a femtosecond laser oscillator, splitting the femtosecond laser beam into at least first and second femtosecond laser beams and condensing the at least first and second femtosecond laser beams to have different focal depths, and irradiating the condensed at least first and second femtosecond laser beams onto the substrate at different positions, thereby cutting the substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Generally, ablation carried out by a laser is mainly used for the manufacture of high-accuracy precision elements. Where high-speed laser pulses are used, there is an advantage in that it is possible to reduce damage of the substrate around a region where the laser pulses are irradiated. For this reason, laser machines using a YAG laser or excimer layer having a pulse speed on the order of nanoseconds, for example, $10^{-9}$ m/s, are generally used. Such a laser machine is called a "nanosecond laser machine".

However, YAG laser machines, in which aluminum oxide is artificially crystallized to generate a laser, have a problem in that side walls machined by a YAG laser tend to be rough. In the case of a $CO_2$ laser, which is an infrared-based laser, there is a drawback in that craters may be formed at the machined region. For this reason, such lasers cannot be used for a micro machining process requiring an accuracy to the micrometers of higher.

That is, the above-described machining may be referred to as a "thermal laser machining", because the machining is carried out using thermal energy converted from optical energy. For this reason, using such a machining method, it is difficult to achieve precise machining because the machined structure may be easily collapsed.

On the other hand, in the case of an excimer laser, sublimate etching is carried out in accordance with an opto-chemical reaction causing disconnection of covalent bonds of carbon atoms. Accordingly, precise machining is possible. That is, when an excimer laser is irradiated to the surface of an object to be machined, the irradiated surface portion of the object is dissipated together with plasma and shock noise, and thus, is decomposed. Thus, ablative photo decomposition is carried out, so that endothermic evaporation machining is achieved which can provide a high machining accuracy.

The energy of the excimer laser is not used only for the disconnection of the covalent bonds of carbon atoms. In other words, a part of the excimer laser energy is converted to thermal energy. Since the excimer laser energy has a high density, the effect of the converted thermal energy is considerable. For this reason, it is difficult to machine mineral materials such as metal, ceramic, and silicon, and quartz or glass having a low photo absorption rate, using the excimer laser. A thermal deformation generated in this case adversely affects durability of the machined product, even through the thermal deformation is caused by thermal energy lower than that of the latter case.

On the other hand, the femtosecond laser, the pulse speed of which is about $10^{-15}$ m/s, has superior characteristics for solving the above-described problems. This is possible because a very high oscillation density of laser energy can be obtained when a laser oscillating for an ultra-short pulse radiation duration of 1 picosecond or shorter, that is, $1 \times 10^{-12}$ m/s or shorter, is used. When a laser has photo energy of 1 mJ, and a pulse radiation duration of 100 femtoseconds or shorter, the energy density of the laser reaches a level of about 10 Gigawatts. In this case, accordingly, it is possible to machine any materials.

Meanwhile, when an ultra-short pulse laser such as a femtosecond laser is radiated to an object to be machined, a multiphoton phenomenon occurs in the lattices of the material of the object, thereby causing the atoms of the material to be excited. However, the duration of the incident laser pulses is shorter than the time taken for photons to transfer heat to the lattices around the photons during the excitation of the atoms. Accordingly, it is possible to solve problems of a degradation in machining accuracy, physical and chemical variations in the properties of the material, and a partial melting of the machined portion of the object, which are caused by heat diffusion occurring during the machining of the object. Thus, high-precision machining can be performed.

Moreover, accumulation of particles does not occur during the femtosecond laser machining. Also, little or no by-products, such as craters, are formed. Accordingly, it is unnecessary to use a by-product removing process such as an ultrasonic cleaning process, which is required in the related art methods. It is also possible to machine a material having a high heat transfer coefficient or a low photo absorption rate. Further, it is possible to machine two or more different materials, or a composite material having a multi-layer structure by using a single process.

Hereinafter, a femtosecond laser generating apparatus according to an embodiment of the present invention and a method for cutting a substrate using the femtosecond laser generating apparatus will be described with reference to the annexed drawings.

Figure 6:
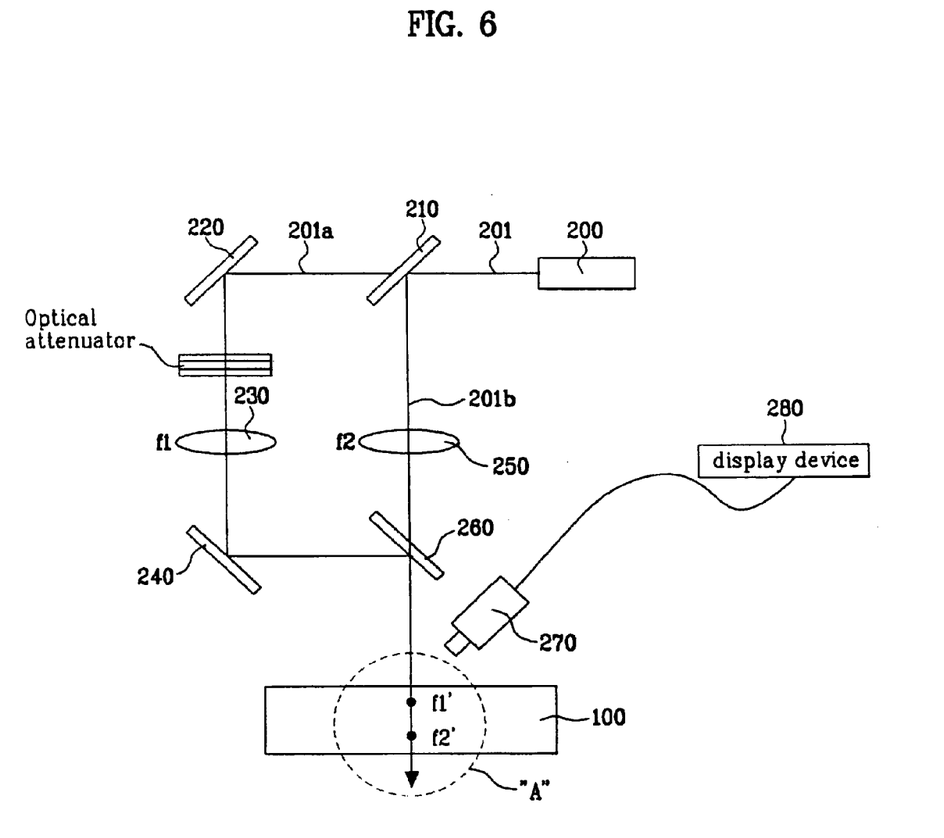
FIG. 6 is a schematic view explaining a method for cutting a substrate using a femtosecond laser in accordance with an embodiment of the present invention.

FIG. 6 is a schematic view illustrating a femtosecond laser generating apparatus according to an embodiment of the present invention. As shown in FIG. 6, the femtosecond laser generating apparatus includes a femtosecond laser oscillator 200 for generating a femtosecond laser beam 201, and a first beam splitter 210 for splitting the femtosecond laser beam 201 generated from the femtosecond laser oscillator 200 into a first femtosecond laser beam 201*a* and a second femtosecond laser beam 201*b*. The femtosecond laser generating apparatus also includes a first mirror 220 for reflecting the first femtosecond laser beam 201*a* emerging from the first beam splitter 210, a first condenser lens 230 for receiving the first femtosecond laser beam 201*a* reflected by the first mirror 220 and condensing the first femtosecond laser beam 201*a* such that the first femtosecond laser beam 201*a* has a depth of focus f1, and a second condenser lens 250 for receiving the second femtosecond laser beam 201*b* emerging from the first beam splitter 210 and condensing the second femtosecond laser beam 201b such that the second femtosecond laser 201b has a depth of focus f2 different from the depth of focus f1.

The femtosecond laser generating apparatus includes a second mirror 240 for reflecting the first femtosecond laser beam 201a condensed through the first condenser lens 230, and a second beam splitter 260 for receiving and splitting the first femtosecond laser beam 201a reflected by the second mirror 240 and the second femtosecond laser beam 201b condensed through the second condenser lens 250, and irradiating the split first and second femtosecond laser beams 201a and 201b to the substrate 100 at different depths, respectively.

Although the oscillating femtosecond laser beam 201 generated from the femtosecond laser oscillator 200 is split into two femtosecond laser beams, that is, the first and second femtosecond laser beams 201a and 201b in the illustrated case, the femtosecond laser beam 201 may be split into three or more femtosecond laser beams which may be, in turn, irradiated to different positions of the substrate to be cut, using a plurality of condenser lenses having different depths of focus, respectively.

In addition, an optical attenuator (not shown) may be arranged between the first mirror 220 and the first condenser lens 230, in order to adjust the energy of the femtosecond laser beam in accordance with the kind of the substrate to be cut (e.g., material and thickness of the substrate). The optical attenuator may be of a disc type wherein an attenuation operation is achieved in accordance with the rotation of the optical attenuator. In this case, however, the beam exhibits different attenuation levels at different portions of the cross-section thereof, when the beam has a large diameter. Accordingly, it is preferred that the optical attenuator include a λ/2 plate rotatable in accordance with driving of a motor, a linear polarizer, and a λ/4 plate, in order to attenuate the intensity of the laser beam by 99% at maximum.

Each of the first and second mirrors 220 and 240 may be formed with a coating adapted to reflect a large part of the femtosecond laser beam at a predetermined angle while transmitting the remaining part of the femtosecond laser beam therethrough such that the transmitted femtosecond laser beam passes through a photodiode (not shown) adapted to measure the energy of the femtosecond laser beam. In this case, the optical attenuator can be controlled in accordance with the measured intensity of the femtosecond laser beam, to achieve an enhancement in accuracy.

Meanwhile, when the femtosecond laser beam 201 is generated from the femtosecond laser oscillator 200, it may be possible to identify a cutting position on the substrate 100 using a CCD camera (not shown) arranged on the same axis as the generated femtosecond laser beam 201. Also, an image of the substrate 100 may be displayed through a display device 280, in order to accurately cut a desired portion of the substrate 100.

Since the femtosecond laser, which is used in accordance with an embodiment of the present invention to cut a mother substrate formed with a plurality of liquid crystal panels, for separating the mother substrate into a plurality of unit liquid crystal panels, has a short pulse width (about 150 fs) and a high peak power per pulse, thermal expansion and generation of shock waves do not occur around a portion of the substrate 100, which is cut, during the cutting operation.

Meanwhile, the femtosecond laser beam has characteristics different from those of general laser beams. That is, "monochromaticity", which is one of the laser characteristics, does not exist in the femtosecond laser beam. Contrary to general lasers, the femtosecond laser has a considerably wide spectrum range. Also, the femtosecond laser beam amplified through the condenser lenses having different depths of focus has a peak power much higher than those of general laser beams, for example, a peak power on the order of terawatts ($10^{12}$ watts). Recently, such an amplified femtosecond laser has exhibited a peak power increased to petawatts ($10^{15}$ watts).

Accordingly, the femtosecond laser may be called "T3 laser (Table Top Terawatt Laser)". It is possible to greatly increase the density of the laser by simply condensing the laser through a condenser lens. When the laser beam is focused onto an object, the material of the object around the focus is indeed instantly changed to a plasma state.

With some exceptions, the femtosecond laser generally has a pulse energy on the order of micro-Joules (μJ) per pulse. In some cases, the femtosecond laser has a stronger pulse energy on the order of milli-Joules per pulse corresponding to mean power of about 1 Watt.

Plasma generated by a general laser reacts with the laser to absorb the laser or to heat the material to be machined. As a result, such plasma causes various problems such as an increase in heat affect, unstable machining, and a degradation in efficiency. However, the femtosecond laser changes such circumstances caused by plasma.

Generally, an acceptor receiving the energy of a laser at the side of the material to be machined by the laser is an electron. In the case of a metal, the acceptor has a free electron existing in a conduction band or an electron excited into the conduction band by light. The electron (electron system) is vibrated by a vibrating electric field of the laser. That is, the electron receives energy from the laser. The vibrating electron strikes atoms or ions existing in the lattices of the material (lattice system), thereby providing atoms or ions with a kinetic energy to (i.e., causing an increase in the temperature of the material). As a result, the phase of the material is changed (melting or evaporation), thereby causing the material to be machined.

The time taken for the energy to be transferred from the electron system to the lattice system is on the order of femtoseconds. Accordingly, in the femtosecond laser machining, absorption of the laser energy and change of the material (to be machined) following the laser energy absorption are temporally separated from each other.

For example, the time taken for the atoms of the irradiated material to be ionized, and thus, to generate plasma, is longer than the pulse width of the femtosecond laser. Accordingly, it is expected that the plasma cannot react with the laser. Furthermore, the time taken for the heat generated at the irradiated region to be diffused around the irradiated region is shorter than the pulse width of the femtosecond layer. The energy of the laser exists locally in the irradiated region, so that the phase change of the material occurs only in the irradiated region. Thus, when a substrate is cut by using the femtosecond laser in accordance with an embodiment of the present invention, the cutting is achieved without formation of a heat affected zone around the region where the cutting is carried out.

Hereinafter, the substrate cutting method using the femtosecond laser generated from the femtosecond laser generating apparatus according to an embodiment of the present invention will be described in more detail.

In accordance with this substrate cutting method, a substrate 100, which is a mother substrate formed with a plurality of liquid crystal panels, and is to be cut for separating the mother substrate into a plurality of unit liquid crystal panels, is first arranged on a movable stage (not shown). Thereafter, a femtosecond laser beam 201 is generated from the femtosecond laser oscillator 200.

Meanwhile, when the femtosecond laser beam 201 is generated from the femtosecond laser oscillator 200, identification of a cutting position on the substrate 100 is carried out using the CCD camera (not shown) arranged on the same axis as the generated femtosecond laser beam 201. Also, an image of the substrate 100 is displayed in order to accurately cut a desired portion of the substrate 100.

Subsequently, the intensity and density of the femtosecond laser beam 201 generated from the femtosecond laser oscillator 200 are adjusted. The adjusted femtosecond laser beam 201 is then split through the first beam splitter 210 into a first femtosecond laser beam 201a and a second femtosecond laser beam 201b. The femtosecond laser beam 201a emerging from the first beam splitter 210 is reflected by the first mirror 220.

The first femtosecond laser beam 201a reflected by the first mirror 220 is condensed through the first condenser lens 230 which has the first depth of focus f1. The first femtosecond laser beam 201a condensed through the first condenser lens 230 having the first depth of focus f1 is then reflected by the second mirror 240.

Subsequently, the second femtosecond laser beam 201b emerging from the first beam splitter 210 is condensed through the second condenser lens 250 which has the second depth of focus f2 different from the depth of focus f1. The second beam splitter 260 receives and splits the first femtosecond laser beam 201a reflected by the second mirror 240 and the second femtosecond laser 201b condensed through the second condenser lens 250, and irradiates the split first and second femtosecond laser beams 201a and 201b to the substrate 100, to be cut, at different positions. In this state, the substrate 100 is cut while moving the stage in one direction.

The cutting of the substrate 100 may be carried out while moving the femtosecond laser oscillator 200 in one direction in a fixed state of the stage. In order to allow the operator to check the cutting condition during the cutting process, a corresponding image picked up by the CCD camera 270 may be displayed through the display device 280 as a monitoring device.

Figure 7:
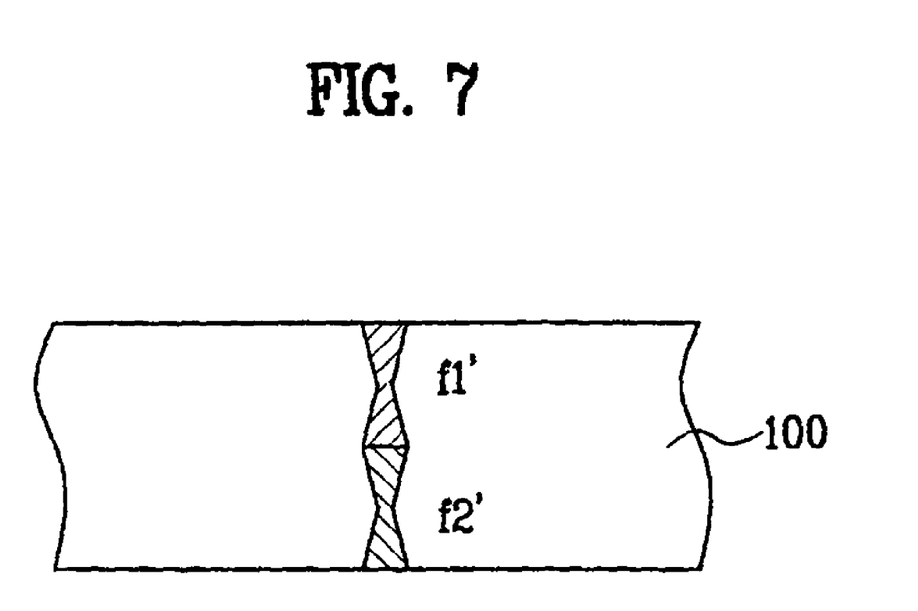
FIG. 7 is an enlarged view corresponding to a portion "A" of FIG. 6, showing a cross-sectional view of the substrate after the substrate cutting process is carried out using the femtosecond lasers having different depths of focus in accordance with an embodiment of the present invention.

FIG. 7 is an enlarged view corresponding to a portion "A" of FIG. 6, showing the cut state of the substrate after the substrate cutting process is carried out using the femtosecond lasers having different depths of focus in accordance with an embodiment of the present invention.

When it is desired to cut the substrate 100, which is a mother substrate formed with a plurality of liquid crystal panels, for separating the mother substrate into the unit liquid crystal panels, femtosecond laser beams having different depths of focus f1 and f2 are irradiated to the substrate 100 at different positions f1' and f2', respectively, for cutting of the substrate 100, as shown in FIG. 7.

When the cutting process is carried out at a cutting width of about 40 μm, neither thermal expansion nor generation of shock waves occur around the region where the cutting is carried out. Under this condition, accordingly, the substrate 100 is uniformly and accurately cut in a desired cutting direction.

That is, when the substrate is cut by irradiating a plurality of femtosecond laser beams having different depths of focus at different positions, it is possible to minimize the angle of a taper surface formed at a region where the substrate is cut. Accordingly, it is possible to accurately and cleanly cut the substrate without forming paddings or depositions on the edge and side surfaces of the cut substrate portion.

Figure 8:
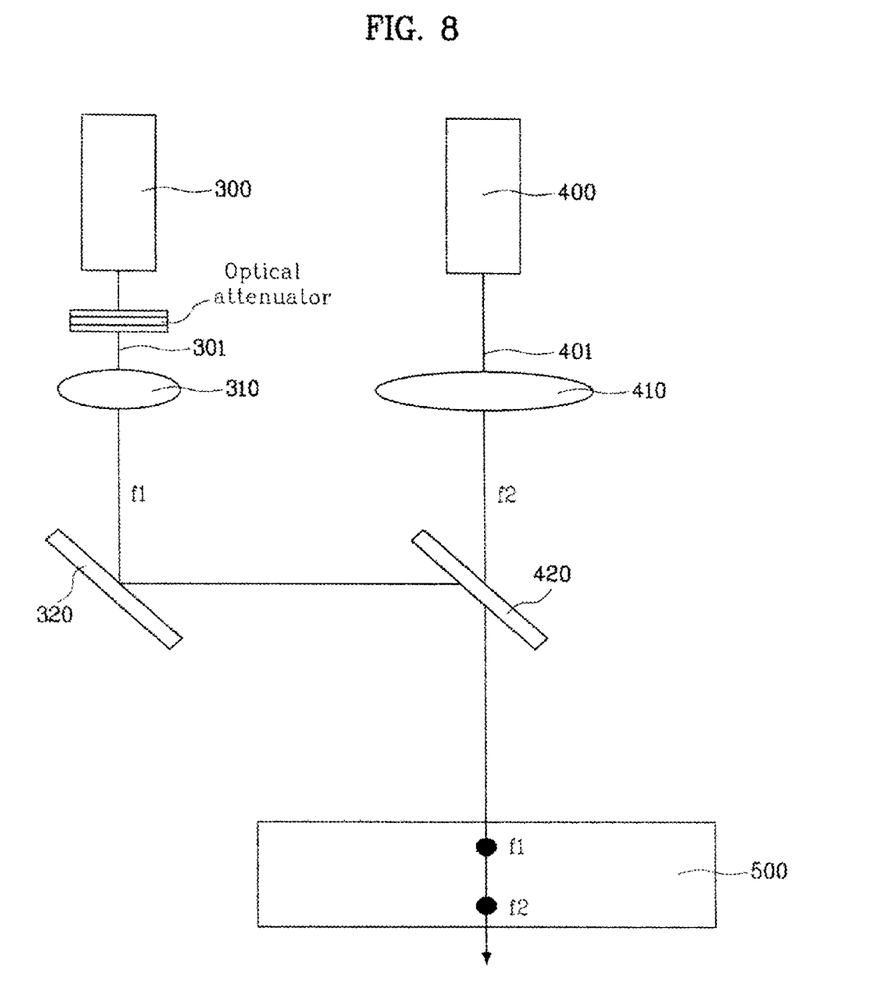
FIG. 8 is a schematic view illustrating a femtosecond laser generating apparatus according to another embodiment of the present invention.

FIG. 8 is a schematic view illustrating a femtosecond laser generating apparatus according to another embodiment of the present invention. As shown in FIG. 8, the femtosecond laser generating apparatus includes a first femtosecond laser oscillator 300 and a second femtosecond laser oscillator 400 which generate femtosecond laser beams 301 and 401, respectively, and a first condenser lens 310 and a second condenser lens 410 which receive the first and second femtosecond laser beams 301 from the first and second femtosecond laser oscillator 300 and 400 and condense the first and second femtosecond laser beams 301 and 401 such that the first and second femtosecond laser beams 301 and 401 have different depths of focus f1 and f2, respectively.

The femtosecond laser generating apparatus also includes a mirror 320 for reflecting the first femtosecond laser beam 301 condensed through the first condenser lens 310, and a beam splitter 420 for receiving and splitting the first femtosecond laser beam 301 reflected by the mirror 320 and the second femtosecond laser beam 401 condensed through the second condenser lens 410, and irradiating the split first and second femtosecond laser beams 301 and 401 to a substrate 500 at different positions.

Although two femtosecond laser oscillators 300 and 400 are used in this case, three or more femtosecond laser oscillators can be used to generate three or more femtosecond laser beams having different depths of focus, for cutting of a substrate. Further, the number of mirrors used for three or more femtosecond laser oscillators having different depths of focus may be one less than the number of the femtosecond laser oscillators.

As apparent from the above description, the femtosecond laser generating apparatus according to embodiments of the present invention and the substrate cutting method using the same have various effects. For example, since a plurality of femtosecond lasers having different depths of focus are irradiated to a substrate, to be cut, at different positions, respectively, for cutting of the substrate, it is possible to minimize the angle of a taper surface formed after the cutting.

It will be apparent to those skilled in the art that various modifications and variations can be made in the apparatus for cutting a substrate and the method using the same of the present invention without departing from the spirit or scope of the inventions. Thus, it is intended that the present invention covers the modifications and variations of this invention provided they come within the scope of the appended claims and their equivalents.

What is claimed is:

1. An apparatus for cutting a substrate, comprising:
 a plurality of laser oscillators generating at least first and second femtosecond laser beams;
 a plurality of condenser lenses receiving the at least first and second femtosecond laser beams, and condensing the received at least first and second femtosecond laser beams to have first and second focal depths being different from each other, respectively;
 a reflector reflecting the first condensed femtosecond laser beam;
 an optical attenuator between the reflector and the first condenser lens to adjust energy of the femtosecond laser beams; and
 a beam splitter receiving and splitting the condensed at least first and second femtosecond laser beams, and irradiating the split at least first and second femtosecond laser beams at different depths in the direction vertical to the substrate to be cut,
 wherein the optical attenuator includes a λ/2 plate, a linear polarizer, and a λ/4 plate are the three parts.

* * * * *